US006922322B2

(12) United States Patent
Strayer et al.

(10) Patent No.: US 6,922,322 B2
(45) Date of Patent: Jul. 26, 2005

(54) HIGH SIDE REVERSE AND OVERVOLTAGE TRANSIENT PROTECTION

(75) Inventors: Lance R. Strayer, Clarkston, MI (US); Lawrence D. Hazelton, Goodrich, MI (US)

(73) Assignee: Delphi Technologies, Inc., Troy, MI (US)

( * ) Notice: Subject to any disclaimer, the term of this patent is extended or adjusted under 35 U.S.C. 154(b) by 371 days.

(21) Appl. No.: 10/356,460

(22) Filed: Jan. 31, 2003

(65) Prior Publication Data

US 2004/0150927 A1 Aug. 5, 2004

(51) Int. Cl.$^7$ .............................................. H02H 7/10
(52) U.S. Cl. ..................................... 361/111; 361/82
(58) Field of Search ................... 361/111, 118, 361/82

(56) References Cited

U.S. PATENT DOCUMENTS

| | | | | |
|---|---|---|---|---|
| 4,020,395 A | * | 4/1977 | Erickson et al. | 361/59 |
| 4,723,191 A | * | 2/1988 | Menniti | 361/92 |
| 5,615,097 A | * | 3/1997 | Cross | 363/84 |
| 6,043,965 A | | 3/2000 | Hazelton et al. | 361/84 |
| 6,154,081 A | | 11/2000 | Pakkala et al. | 327/309 |
| 6,198,350 B1 | | 3/2001 | Zarabadi | 330/297 |
| 6,204,715 B1 | | 3/2001 | Sellanau et al. | 327/310 |
| 6,392,266 B1 | | 5/2002 | Robb et al. | 257/314 |
| 6,407,937 B2 | * | 6/2002 | Bruckmann et al. | 363/56.05 |
| 6,697,241 B1 | * | 2/2004 | Smith | 361/91.1 |

* cited by examiner

*Primary Examiner*—Brian Sircus
*Assistant Examiner*—Boris Benenson
(74) *Attorney, Agent, or Firm*—Jimmy L. Funke

(57) ABSTRACT

A high side reverse voltage and overvoltage protection circuit configuration comprising: a first switching device in operable communication with a transient protected voltage source; a second switching device in operable communication and in series with the first switching device and in operable communication with an unprotected voltage source; a control circuit configured to control the first switching device and the second switching device in operable communication with another transient protected voltage source. The first switching device is configured to provide reverse voltage protection for the transient protected voltage source; and the second switching device is configured to provide overvoltage protection for the transient protected voltage source.

18 Claims, 3 Drawing Sheets

HIGH SIDE REVERSE AND OVERVOLTAGE TRANSIENT PROTECTION

BACKGROUND

This invention relates providing reverse voltage and overvoltage protection for circuits and systems. In particular, vehicle systems subject to accidental reverse polarity voltage applications and over-voltage conditions resultant from load removal and the like. For example, in vehicle systems where integrated circuit microcontrollers are interfaced with motors via MOSFET(s) for motor position controllers such as may be employed in vehicle steering systems. Such systems may use control electronics to provide the interface between low voltage microcontrollers and the high voltage MOSFETs. The control electronics may also include motor control logic, a charge pump, MOSFET gate drives and overvoltage and overcurrent protection.

Unfortunately, many electronic systems include components that can be susceptible to voltage transients on their supply voltage. Such transients in certain circumstances may even destroy the components leading to early failure and excessive repairs. Another option to protect such electronics modules from transients and reverse voltage would be to use transient suppression devices to limit the voltage below the maximum input voltages for the devices. Unfortunately, if there were a great amount of energy in the transient pulse, the transient suppression devices would be very large and expensive. Therefore, it would be beneficial to provide a cost effective means of protecting high side circuits from reverse and over voltage transients.

BRIEF SUMMARY

Disclosed herein is a high side reverse voltage and overvoltage protection circuit configuration comprising: a first switching device in operable communication with a transient protected voltage source; a second switching device in operable communication and in series with the first switching device and in operable communication with an unprotected voltage source; a control circuit configured to control the first switching device and the second switching device in operable communication with another transient protected voltage source. The first switching device is configured to provide reverse voltage protection for the transient protected voltage source; and the second switching device is configured to provide overvoltage protection for the transient protected voltage source.

Also disclosed herein is a method for providing a high side reverse voltage and overvoltage protection comprising: blocking reverse voltage transients of a voltage source with a first switching device; limiting overvoltage transients of the voltage source with a second switching device; and controlling the first switching device and the second switching device with a control circuit in operable communication with another transient protected voltage source. The control circuit is responsive to at least one of an over voltage transient and a reverse transient of the voltage source.

Further, disclosed herein is system for providing a high side reverse voltage and overvoltage protection comprising: a means for blocking reverse voltage transients of a voltage source with a first switching device in operable communication with a transient protected voltage source; a means for limiting overvoltage transients of the voltage source with a second switching device in operable communication and in series with the first switching device and in operable communication with the voltage source; and a means for controlling the first switching device and the second switching device with a control circuit in operable communication with another transient protected voltage source. The control circuit is responsive to at least one of an over voltage transient and a reverse transient of the voltage source.

BRIEF DESCRIPTION OF THE DRAWINGS

The present invention will now be described, by way of an example, with references to the accompanying drawings, wherein like elements are numbered alike in the several figures in which.

DESCRIPTION OF AN EXEMPLARY EMBODIMENT

Figure 1:
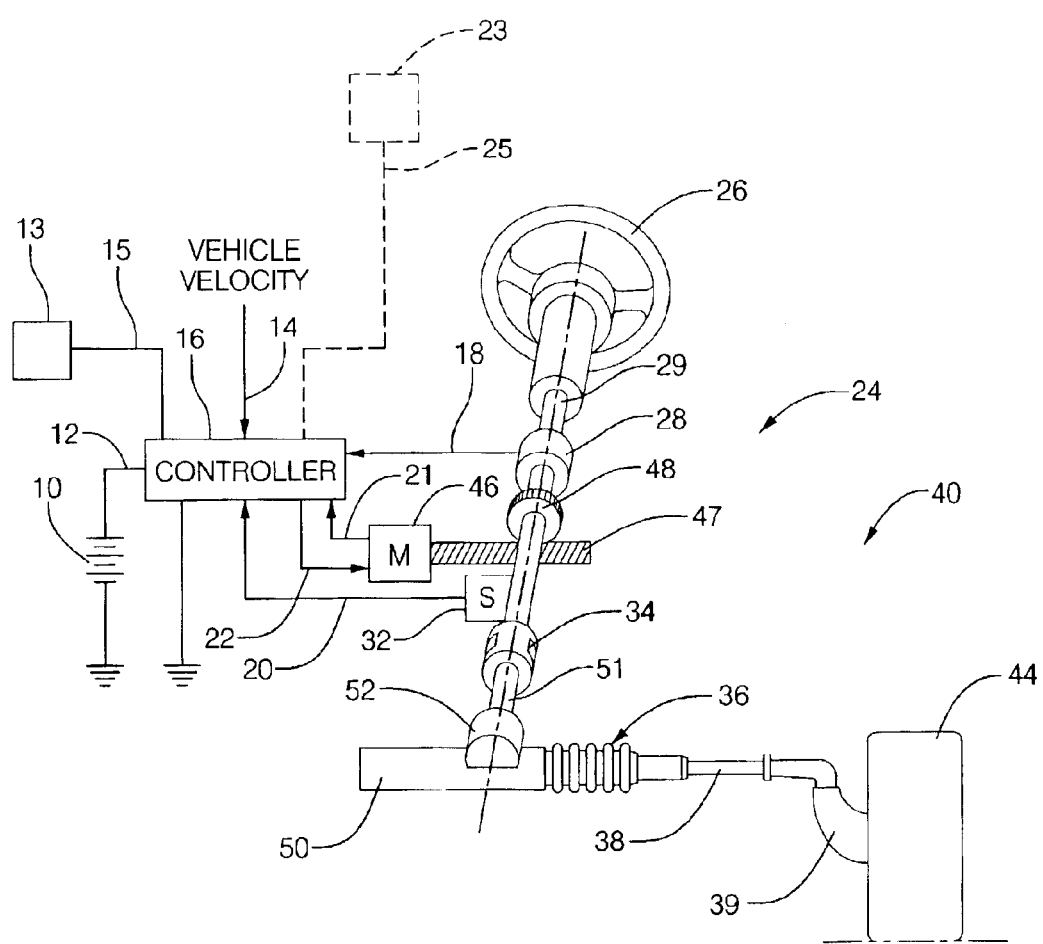
FIG. 1 depicts a simplified block diagram of a power steering system employing an exemplary embodiment.

Referring to FIG. 1, reference numeral 40 generally designates a motor vehicle electric power steering system suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g. a hand wheel and the like) is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through a control system generally designated by reference numeral 24 and includes the controller 16 and the electric motor 46. The controller 16 is powered by the vehicle power supply 10 through line 12. The controller 16 receives a vehicle speed signal 14 representative of the vehicle velocity. Steering pinion gear angle is measured through position sensor 32, which may be an optical encoding type sensor, variable resistance type sensor, or any other suitable type of position sensor, and supplies to the controller 16 a position signal 20. Motor velocity may be measured with a tachometer and transmitted to controller 16 as a motor velocity signal 21. A motor velocity denoted $\omega_m$ may be measured, calculated or a combination thereof. For example, the motor velocity $\omega_m$ may be calculated as the change of the motor position $\theta$ as measured by a position sensor 32 over a prescribed time interval. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is the preferable torque sensor, any other suitable torque-sensing device used with known signal processing techniques will suffice. In response to the various inputs (e.g.—vehicle speed, steering wheel angle, steering wheel angular speed, steering wheel torque), the controller sends a command 22 to the electric motor 46, which supplies torque assist to the steering system 40 through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any instance where rotational displacement, e.g., torque sensing is desired. Moreover, the references and descriptions herein may apply to many forms of parameter sensors, including, but not limited to torque, position, speed and the like. It should also be noted that reference herein to electric machines including, but not limited to, motors, or more specifically sinusoidally excited brushless DC motors, hereafter, for brevity and simplicity, reference will be made to motors only without limitation.

In the control system 24 as depicted, the controller 16 utilizes the torque, position, and speed, and the like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 46. Controller 16 is configured to develop the necessary voltage(s) out of inverter (not shown) such that, when applied to the motor 46, the desired torque or position is generated. Because these voltages are related to the position and speed of the motor 46 and the desired torque, the position and/or speed of the rotor and the torque applied by an operator are determined. A position encoder is connected to the lower steering shaft 51 to detect the angular position θ. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the lower steering shaft 51 and thereby, that of the motor 46.

Desired torque may be determined by one or more torque sensors 28 transmitting torque signals 18 indicative of an applied torque. An exemplary embodiment includes such a torque sensor 28 and the torque signal(s) 18 therefrom, as may be responsive to a compliant torsion bar, T-bar, spring, or similar apparatus (not shown) configured to provide a response indicative of the torque applied.

Optionally, a temperature sensor(s) 23 located at the torque sensor 28. Preferably the temperature sensor 23 is configured to directly measure the temperature of the sensing portion of the torque sensor 28. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above-mentioned are also commonly linearized, compensated, and filtered as desired or necessary to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., control algorithm(s), and the like), controller 16 may include, but not be limited to, a processor(s), computer(s), DSP(s), microcontrollers, memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

In an exemplary embodiment, the controller 16 obtains as input signals or receives signals to facilitate computing, commands for controlling a motor. Also received by the controller 16 are a variety of implementation specific parameters, signals and values for initialization and characterization of the prescribed processes and to identify various states of the processes herein.

Continuing now with FIG. 2, reference number 16 generally designates a controller and includes a processor or microcontroller, hereinafter denoted microcontroller 100, MOSFETs 104 and 106, and a simplified control circuit 17 for providing reverse voltage and over-voltage protection for circuits and systems. In particular, an exemplary embodiment may be employed in vehicle systems employing a vehicle power supply 10 subject to accidental reverse polarity voltage applications and over-voltage conditions resultant from load removal and the like. For example, in vehicle systems where electronic controllers contain microcontroller(s) 100 that are interfaced with high voltage MOSFET(s) (metal oxide semiconductor field effect transistor) for motor position controllers. Such as maybe employed in control system 24. Such systems may use a MOSFET pre-driver circuit hereinafter denoted pre-driver 102 to provide the interface between microcontroller 100 and high voltage MOSFETs 104 and 106. The pre-driver 102 may also include motor control logic and MOSFET gate drive(s) 108, a charge pump 110, and over-voltage protection 112 and over-current protection (not shown). A pre-driver 102 circuit may also provide high side reverse voltage detection 114 and control logic 116. Reverse voltage protection often employs a switching device 120, for example, an N-channel MOSFET, hereinafter MOSFET 120 operably connected source to a selected voltage source 122, e.g., switched ignition hereinafter denoted Ignition 122, and drain to the electronic circuitry subject to protection. In this instance, a protected ignition voltage source 124 hereinafter denoted IgnP 124, and the motor control MOSFETs 104 and 106. The reverse voltage control logic 116 of the pre-driver 102 controls the gate voltage to this MOSFET. Under normal operational conditions, the gate of this MOSFET is kept at about 12 Volts above Ignition 122 (by the charge pump 110) turning the MOSFET "on" and thereby providing a low resistance connection to voltage source, Ignition 122. Should a reverse voltage be applied, it is detected by the reverse voltage detection 114 and the MOSFET 120 is commanded "off." The body diode of the MOSFET 120 provides reverse voltage protection isolating the remainder of the pre-driver and motor control MOSFETs 104 and 106 from the reverse voltage and thereby preventing damage.

For proper operation of the predriver 102, the charge pump 110 is required to provide a voltage higher than Ignition 122 (to use an N-channel MOSFETs for both motor drive 104, 106 and reverse voltage protection MOSFET 120). Because of this higher voltage, an overvoltage shutdown feature is included internal to the predriver 102 to prevent damage to the predriver 102 and external components. Therefore, voltage from the charge pump 110 is limited to a value below the maximum breakdown voltage of the silicon device (e.g., 40 to 60 Volts). This overvoltage shutdown turns off the charge pump 110 and the charge pump voltage output decays to the level of voltage source, Ignition 122.

While this configuration provides reverse battery protection using a MOSFET, the predriver 102 and other electronics exhibit limits as to the maximum voltage that they can withstand, for example, about 60 volts, therefore, overvoltage protection is also considered. For many vehicles, a load dump e.g., battery disconnect and the like, are typically suppressed limiting the maximum voltage to approximately 34 Volts. However, on some vehicle systems, for example on trucks employing 24 Volt electrical systems, load dumps are unsuppressed and transients for the voltage supply, Ignition 122 can reach peak voltages of 180 Volts.

Figure 3:
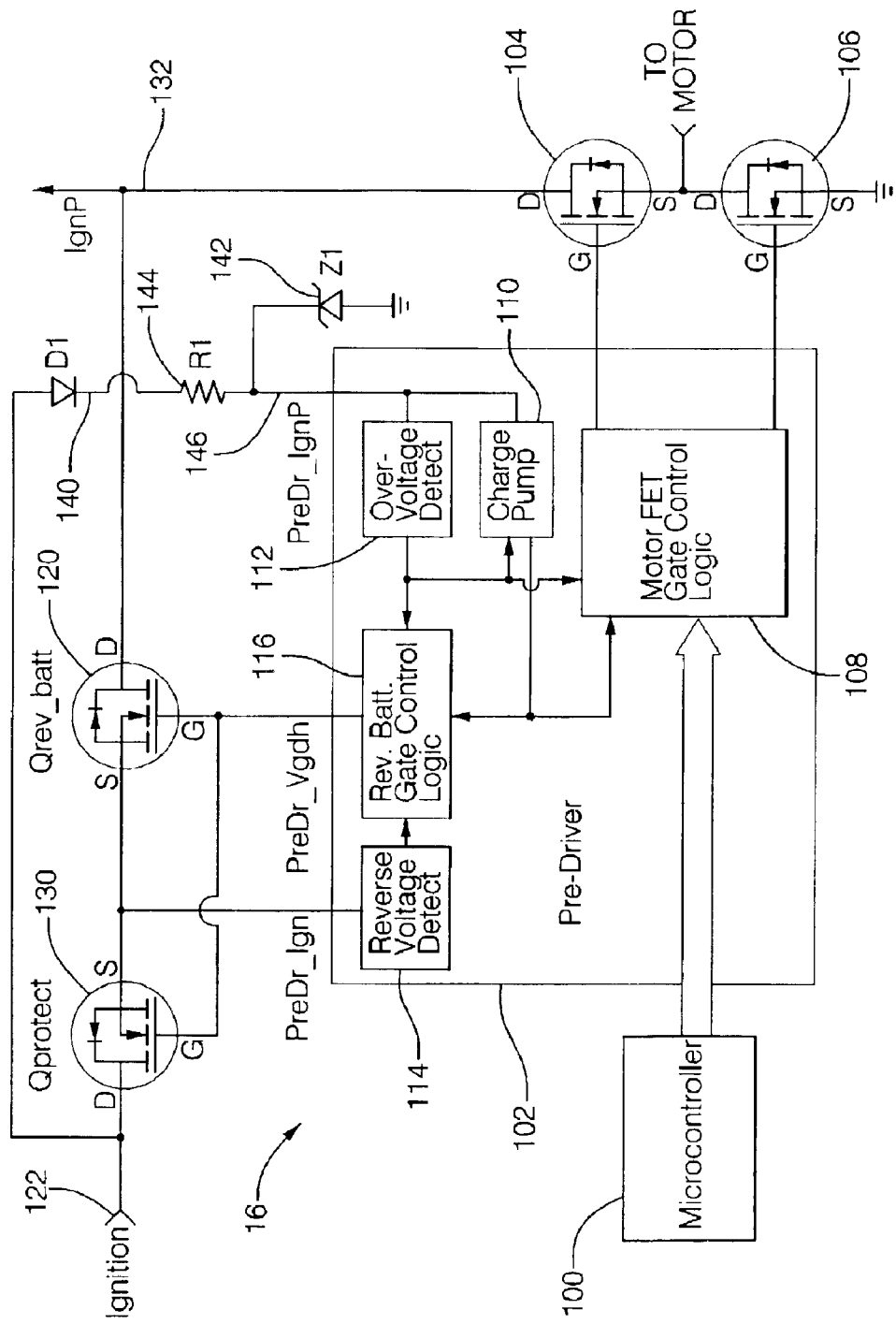
FIG. 3 is a simplified block diagram of a motor control system with a predriver and protection in accordance with an exemplary embodiment.

Referring now to FIG. 3, in an exemplary embodiment, the abovementioned, overvoltage may readily be addressed by inclusion of additional circuitry for overvoltage protection.

In an exemplary embodiment overvoltage protection may be provided by adding another switching device in this instance, a second MOSFET 130 also denoted $Q_{PROTECT}$ in series with the reverse protection MOSFET 120 on voltage supply Ignition 122. This second MOSFET 130 is operably connected drain to Ignition 122 and source to the rest of the circuit including the source of the reverse voltage MOSFET 120. It should be appreciated that this connection is opposite of the reverse voltage MOSFET 120.

Figure 2:
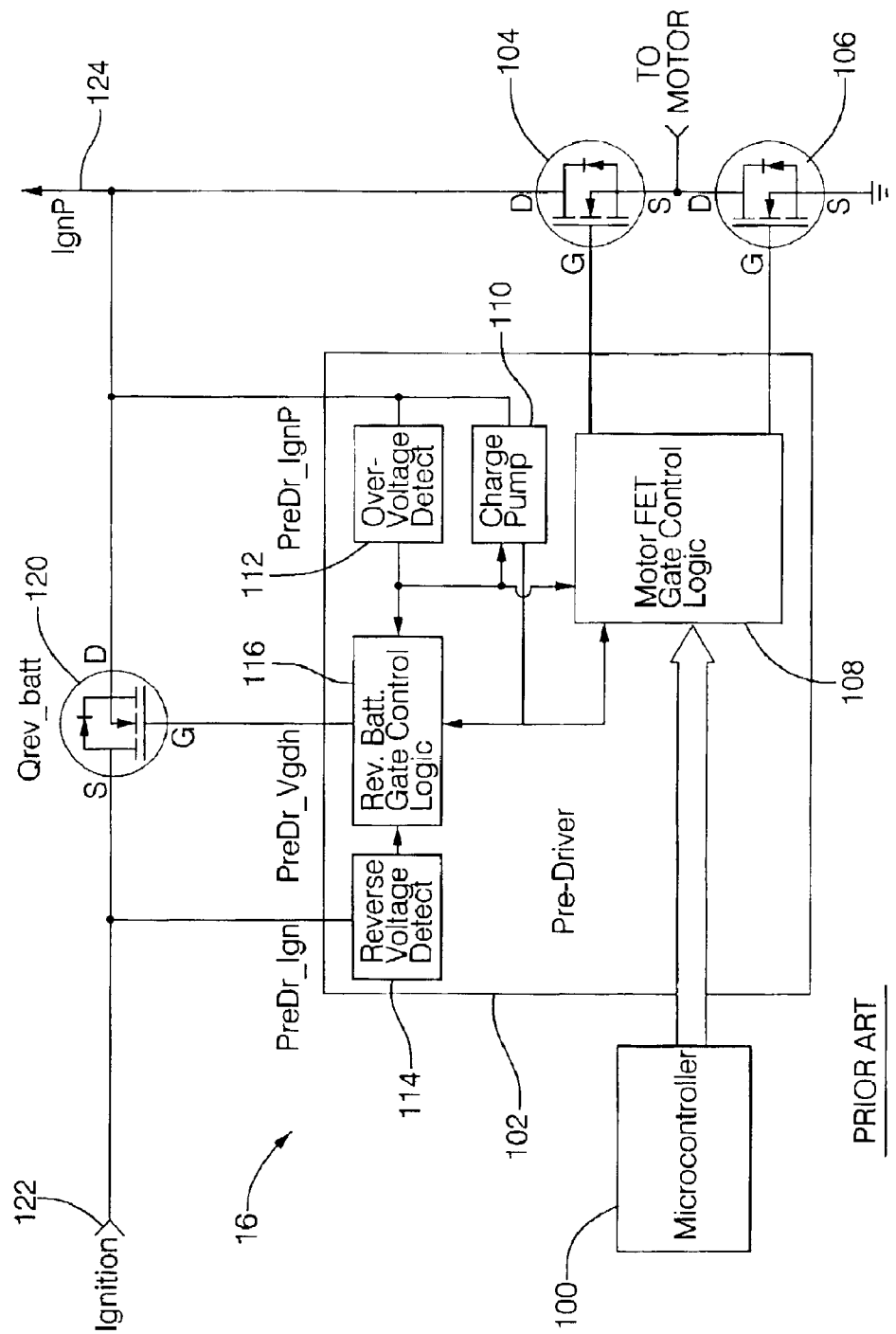
FIG. 2 is a simplified block diagram of an existing motor control system with a predriver.

The body diode of the reverse voltage MOSFET 120 allows current to flow (with a standard diode drop) to protected ignition denoted IgnP 124 in the figure, which powers the predriver 102 (from FIG. 2). However, with the inclusion of the second MOSFET 130, the body diode of this second MOSFET 130 will not allow any current to flow until the second MOSFET 130 is "on" with the application of a sufficient Vgs(on).

Therefore, another protected ignition voltage source is needed to ensure provision of power for operation of the predriver 102. In an exemplary embodiment, this is readily accomplished by using a diode 140 and transient suppressor zener diode 142 with series resistor 144 (to limit current) to protect the predriver 102 from the overvoltages above a selected maximum input voltage. The zener voltage for the zener diode 142 is selected to be less than the maximum input voltage of the predriver 102 and yet above the maximum overvoltage protection threshold of the predriver 102 discussed above.

In an exemplary embodiment, at power-up, the protected ignition to the predriver 146 (also denoted PreDr_IgnP in the figure) will rise to the voltage level at Ignition 122 minus a diode drop. When this voltage is above the minimum operating voltage of the pre-driver 102, the pre-driver 102 will start operation of the charge pump 110 to initiate the reverse voltage MOSFET 120 (also Qrev_batt in the figures) and overvoltage protection second MOSFET 130 (Qprotect). Once the charge pump voltage rises above Vgs(on) of the MOSFETs, both the overvoltage protection and reverse battery MOSFETs e.g., 120, 130 will turn "on" and the protected voltage source, IgnP 124 to the rest of the module will rise to the voltage level of Ignition 122 (minus the series Rds(on) voltage drop of the MOSFETs 120 and 130 respectively).

In the event of an overvoltage at voltage source Ignition 122, the predriver protected ignition (PreDr_IgnP) 146 voltage rises above the overvoltage shutdown threshold of the predriver 102, as stated earlier, the charge pump 110 is halted. The gate voltage to the reverse battery and overvoltage protection MOSFETs 120 and 130 respectively, will then decay to the voltage of PreDr_IgnP 146 as controlled by the zener voltage of zener diode 142, in an exemplary embodiment, about 36 Volts. Advantageously, under these conditions, the second switching device 130 MOSFET, employed for overvoltage protection operates as a linear voltage regulator with the source voltage equal to the gate voltage minus Vgs(on) (e.g., about 36 Volts—about 4 Volts= about 32 Volts). The voltage supplied/limited to IgnP 124 and to the rest of the predriver 102 would then equal the above source voltage minus the body diode forward voltage drop of the reverse battery MOSFET 120.

Employing the above described methodology, the maximum transient voltage the circuit is configured to tolerate is only limited by the breakdown voltage of the MOSFET 130 (Qprotect). Therefore, advantageously, the only device requiring a high voltage rating is the overvoltage protection, MOSFET 130. The MOSFET 130 will experience the full-applied Ignition voltage transients (potentially 180 volts for a 24 Volt systems) minus the regulated voltage of the protected ignition voltage source, IgnP 124. For example, about 180 volts minus about 32 volts or 148 Volts. Yet another advantage is that the transient suppressor zener diode 142 may be relatively small since the series resistor 144 limits the potential current and therefore the power dissipated. Finally, it will be appreciated that with a configuration as disclosed above, other circuit components and electronics including, but not limited to the motor MOSFETs 104 and 106 respectively would only need to be rated to withstand the lower maximum IgnP voltage (roughly 32 Volts using a 36 Volt zener diode 142). Reducing the maximum voltage capability requirement facilitates the utilization of lower cost, standard components.

One means of providing protection to the circuitry from these high transient voltages to limit or clamp the input voltage for Ignition 122 to below the maximum input voltages for the circuit components such as, the predriver and the like, would be to employ transient suppression devices including, but not limited to transorbs, varistors, zener diodes, and the like, as well as combinations including at least one of the foregoing. Unfortunately, in such a configuration, there is often a great amount of energy in a transient pulse so the requisite clamping devices would be very large and expensive. Reasonably sized varistors, for example, would not be able to withstand the high peak currents experienced during such transients. Transient voltage suppressors that could withstand the peak power generated are available, but are large and expensive.

It will be appreciated that the use of first and second or other similar nomenclature for denoting similar items is not intended to specify or imply any particular order unless otherwise stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A high side reverse voltage and overvoltage protection circuit configuration comprising:
   a first switching device in operable communication with a transient protected voltage source;
   a second switching device in operable communication and in series with said first switching device and in operable communication with an unprotected voltage source;
   a control circuit configured to control said first switching device and said second switching device in operable communication with another transient protected voltage source; and
   wherein said first switching device is configured to provide reverse voltage protection for said transient protected voltage source; and
   wherein said second switching device is configured to provide overvoltage protection for said transient protected voltage source.

2. The circuit configuration of claim 1 wherein said another transient protected voltage source comprises a diode in series with a resistor, further in series with a zener diode.

3. The circuit configuration of claim 1 wherein said first switching device is a MOSFET arranged so that an integral body diode provides isolation for said transient protected voltage source for reverse voltage transients.

4. The circuit configuration of claim 3 wherein said first switching device is a n-channel MOSFET arranged with a drain thereof operably connected to said transient protected voltage source and a source thereof operably connected to said second switching device.

5. The circuit configuration of claim 1 wherein said second switching device is a n-channel MOSFET arranged with a drain thereof operably connected to said voltage source and a source thereof operably connected to said first switching device.

6. The circuit configuration of claim 1 wherein said control circuit comprises a circuit configured to interface between a controller and another switching device operably connected to a motor and configured to control application of voltage to said motor.

7. The circuit configuration of claim 6 wherein
   said control circuit comprises a predriver and said controller provides a command to said predriver; and
   said switching device comprises a MOSFET responsive to a command from said predriver.

8. A method for providing a high side reverse voltage and overvoltage protection comprising:
   blocking reverse voltage transients of a voltage source with a first switching device;
   limiting overvoltage transients of said voltage source with a second switching device; and
   controlling said first switching device and said second switching device with a control circuit in operable communication with another transient protected voltage source; said control circuit is responsive to at least one of an over voltage transient and a reverse transient of said voltage source.

9. The method of claim 8 wherein said another transient protected voltage source comprises a diode in series with a resistor, further in series with a zener diode.

10. The method of claim 8 wherein said blocking comprises providing isolation for said transient protected voltage source with a first switching device arranged so that an integral diode is reverse biased by a reverse transient of said voltage source relative to said transient protected voltage source.

11. The method of claim 10 wherein said first switching device is an n-channel MOSFET arranged with a drain thereof operably connected to said transient protected voltage source and a source thereof operably connected to said second switching device.

12. The method of claim 8 wherein said limiting comprises controlling said second switching device to maintain said transient protected voltage source at a selected voltage.

13. The method of claim 12 wherein said second switching device is an n-channel MOSFET arranged, drain operably connected to said voltage source and source operably connected to said first switching device.

14. The method of claim 8 wherein said controlling comprises:
   detecting a voltage level of said voltage source; and at least one of:
      commanding at least one of said first switching device and said second switching device to an off state for said reverse transient of said voltage source; and
      commanding at least one of said first switching device and said second switching device to a linear voltage regulating state for said overvoltage transient of said voltage source.

15. The method of claim 8 wherein said control circuit comprises a circuit configured to interface between a controller and another switching device operably connected to a motor and configured to control application of voltage to said motor.

16. The method of claim 15 wherein
   said control circuit comprises a predriver and said controller provides a command to said predriver; and
   said switching device comprises a MOSFET responsive to a command from said predriver.

17. A system for providing a high side reverse voltage and overvoltage protection comprising:
   a means for blocking reverse voltage transients of a voltage source with a first switching device in operable communication with a transient protected voltage source;
   a means for limiting overvoltage transients of said voltage source with a second switching device in operable communication and in series with said first switching device and in operable communication with said voltage source; and
   a means for controlling said first switching device and said second switching device with a control circuit in operable communication with another transient protected voltage source; said control circuit is responsive to at least one of an over voltage transient and a reverse transient of said voltage source.

18. A vehicle steering system with a high side reverse voltage and overvoltage protection circuit configuration comprising:
   a steerable wheel;
   a steering mechanism operably connected to said steerable wheel for transmitting a desired steering command to said steerable wheel;
   a steering input device in operable communication with said steering mechanism configured to generate said desired steering command;

a motor in operable communication with said steering mechanism to provide a torque and in operable communication with a transient protected voltage source;

a first switching device in operable communication with said transient protected voltage source;

a second switching device in operable communication and in series with said first switching device and in operable communication with an unprotected voltage source;

a control circuit configured to control said first switching device and said second switching device in operable communication with said motor and another transient protected voltage source;

a controller is in operable communication with said control circuit, said controller generating a command responsive to said desired steering command;

wherein said first switching device is configured to provide reverse voltage protection for said transient protected voltage source; and wherein said second switching device is configured to provide overvoltage protection for said transient protected voltage source.

* * * * *